Figure 1:
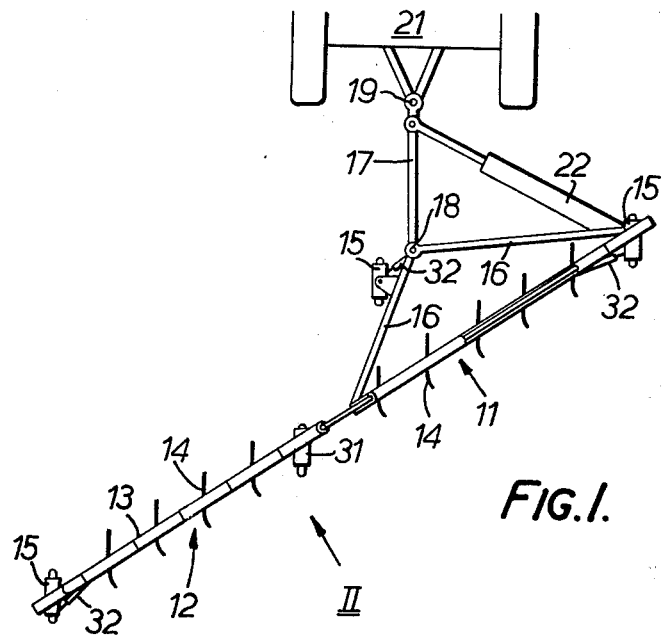

United States Patent [19]
Farrant

[11] 3,983,944
[45] Oct. 5, 1976

[54] TRAILER PLOUGH WITH HINGED BOOM PARTS

[76] Inventor: David John Farrant, Welshes Farm, Clatworthy, Wiveliscombe, Somerset, England

[22] Filed: Nov. 21, 1974

[21] Appl. No.: 525,986

[30] Foreign Application Priority Data
Nov. 20, 1973 United Kingdom............... 53858/73

[52] U.S. Cl................................ 172/314; 172/423; 172/692; 172/693
[51] Int. Cl.²..................... A01B 3/38; A01B 63/00
[58] Field of Search........... 172/282, 284, 285, 286, 172/310, 311, 312, 313, 314, 421, 423, 451, 651, 655, 656, 681, 683, 685, 691, 692, 693, 696, 742, 776; 403/73, 74

[56] References Cited
UNITED STATES PATENTS

| | | |
|---|---|---|
| 1,496,895 | 6/1924 | Kurtz............................ 172/310 X |
| 2,317,841 | 4/1943 | Wittrock............................ 172/421 |
| 3,066,746 | 12/1962 | Sweet................................ 172/284 |
| 3,469,636 | 9/1969 | Kurz ................................ 172/314 |
| 3,487,883 | 1/1970 | Newhouse........................... 172/314 |
| 3,731,748 | 5/1973 | Sullivan et al. ..................... 172/314 |

Primary Examiner—Richard T. Stouffer
Attorney, Agent, or Firm—Watson, Cole, Grindle & Watson

[57] ABSTRACT

This invention is a trailer plough having a double-length boom carrying twice as many shares as a conventional boom to enable a larger area to be ploughed at each pass of the tractor. The boom is in two parts connected together by a hinge having a universal joint at one end and a lost motion connection at the other end thereof, whereby the boom is hinged together for ease of manipulation at the ends of rows and also to enable the rear boom part to be lifted if, say when ploughing uphill, the tractor cannot pull the load due to the full number of shares.

9 Claims, 2 Drawing Figures

TRAILER PLOUGH WITH HINGED BOOM PARTS

This invention relates to trailer ploughs, that is to say ploughs having shares on a structure arranged to be trailed behind a tractor.

An object of the invention is to provide a means enabling such a plough to have a large number of shares so that a large area can be ploughed in one pass of the tractor. In the past it has not been possible to trail a plough with more than about five or six shares.

According to the invention a trailer plough comprises a boom supporting a number of plough shares spaced apart along its length, the boom having a hinge at a point part-way along its length enabling the parts on either side of the hinge to turn relatively to each other about a vertical axis during turning of the tractor at the end of a line of furrows. The hinge enables a boom substantially longer than the width of the tractor to be towed and turned, and that in turn allows the boom to have many — perhaps 15 — shares spaced along its length so that the area that can be ploughed in a single pass is two or three times the area that could be ploughed with a plough with five or six shares.

Preferably each part of the boom is a component of a separate frame with its end wheels and each wheel may be mounted from its frame through a mounting including a hydraulic jack or other lifting means using power from the tractor and under the control of the driver so that at the end of a line of ploughing he can operate the jacks to lift the shares out from the ground. When ploughing is in progress the shares will themselves act to keep the boom straight across the hinge. It is possible to operate the jacks on the trailing frame independently of those on the leading frame so that if, for example, ploughing is uphill and the plough cannot pull the full line of shares then the rear shares can be pulled out of the ground and only the shares on the leading frame used, while for going back downhill the complete line of shares can be used.

In a preferred form of hinge there are a pair of vertically elongated telescoping members one fixed to each of the frames defining the hinge axis and permitting some relative vertical movement to accommodate irregularities in the ground level and one of those telescoping members can be connected to its frame through a lost motion connection to allow some turning about a universal joint at the bottom end of the telescoping members.

The leading frame will in general be provided with a drawbar enabling it to be pivotally connected to the drawbar connection of a tractor and that leading frame is conveniently coupled to the drawbar through a controllable jack which can be used to set the angle of the boom to the drawbar to assist in keeping the front plough wheel in the furrow. Also, it can be adjusted from the position used for ploughing to a position in which it is more nearly parallel with the length of the drawbar for passing through a narrow gate or along a road when the full width of the extended boom will not be an embarrassment if it is extending rearwardly from the tractor rather than projecting transversely.

In some circumstances, pulling 15 shares through the earth will require a greater tractive effort than the tractor can provide, and then it is possible to use the invention which is the subject of British Patent No. 1,285,447 in which a bracket enables part of the load of an implement being trailed to be applied to the rear wheels of the tractor to increase the tractive effort. This could be used whether the plough was the only implement being trailed or was any of a number being trailed in a line behind the tractor.

Figure 2:
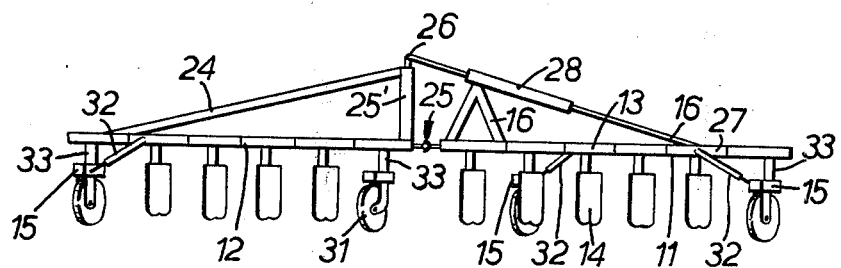

The invention may be carried into practice in various ways and one embodiment will now be described by way of example with reference to the accompanying drawing, in which:

FIG. 1 is a diagrammatic plan view of a plough according to the invention mounted at the rear of a tractor, and FIG. 2 is a view seen in the direction of the arrow 2 in FIG. 1 but with the plough shares only indicated schematically in the interests of clarity.

The plough comprises leading and trailing frames 11 and 12 each of which includes a boom part built up in the example being described, of six individual boom sections 13 each of which is fitted either with a plough share 14 or a wheel 15. The ends of the boom sections 13 fit together so that the farmer can build up a part boom with as many shares and to any length that he likes.

The leading frame 11 comprises framework 16 establishing with the part boom formed by the sections 13 a rigid triangulated frame and also a drawbar 17 pivotally connected to the frame at 18 and having a towing point 19 for coupling to the drawbar connection on the tractor 21. There is a wheel mounting assembly 15 removably fitted to the outer end boom section of each boom part, and on the framework 16 near the pivot 18. A further wheel assembly 31 is removably mounted at the leading end of the trailing frame 12. A hydraulic jack 22 controlled from the tractor can be set to a desired length which determines the angle of the boom 13 to the drawbar 17.

The wheel assembly 31 is supported from its boom section through a mounting which enables the wheel to turn about a vertical axis in the manner of a castor to follow the line of movement. The assemblies 15 for the other three wheels have each a hydraulic jack 32 controlled from the tractor which enables the angle of the wheel plane to the boom to be set. All four wheel assemblies have a similar jack 33 which enables the boom 13 to be raised with respect to the wheels so as to lift the shares 14 out of the ground when ploughing is not required, for example, for transport or for turning at the end of a line of ploughing.

The rear frame 12 merely consists of the boom 13 on its wheels and with its plough shares and vertically elongated framework 24 as shown in FIG. 2.

The two part booms 13 are joined together through a hinge connection as shown in FIG. 2 and including a universal joint 25 between the adjacent ends of the booms and a vertical swivel joint consisting of a tube 25' forming part of the framework 24 on the rear boom 13 in which is telescoped a rod 26 forming part of the frame 11 and connected to a fixture 27 on the frame 11 through a lost motion connection 28 comprising a telescoping rod and sleeve.

The joint enables the rear boom to pivot freely about a vertical axis in relation to the leading boom and also permits relative movement about horizontal axes to accommodate irregularities in the level of the ground.

During ploughing the plough will be as shown in FIG. 1 with the booms 13 on the two frames 11 and 12 substantially in line with each other and substantially retained in line with each other by the action of the plough shares in the soil and the set angle of the wheels 15 running parallel with the furrows. The larger number of shares enables the tractor to plough a substantial width of land in one pass of the tractor because of the great transverse width of the booms carrying the shares. However, problems in turning at the end of a line due to the large number of shares are avoided because of the hinge connection. Also, the jack 32 can be adjusted to help to keep the plough wheel in a furrow.

Thus at the end of a line of ploughing the jacks can be operated to lift the shares on the rear boom or even all the shares so that it is quite simple to turn the tractor making use of the ability to turn about the hinge.

For towing a plough along a road or through a narrow gate the jack 22 is contracted and the wheels 15 are adjusted by the jacks 32 to be moved in line with the boom so that the boom extends much more nearly in a straight line behind the tractor and does not project transversely beyond the tractor wheels.

What I claim as my invention and desire to secure by letters patent is:

1. A trailer plough comprising a boom supporting a number of plough shares spaced apart along its length, the boom having a hinge part-way along its length enabling the parts of the boom on either side of the hinge to turn relatively to each other about a vertical axis, and a drawbar connection on the leading boom part, the hinge comprising a pair of members, one of which is a tube and the other of which is a rod telescopically fitted therein, which members are oriented with respect to the plow and to each other to turn relatively to each other about the vertical axis, each of said members being fixed to a different one of the boom parts from the other of said members, a universal joint affixed to and between the boom parts, said joint being spaced from said pair of members, but adjacent one end thereof and a lost motion connection connecting between the boom parts and extending between the other end of said pair of members and an outwardly disposed fixture on one of the boom parts.

2. A plough as claimed in claim 1 in which each part of the boom is a component of a separate frame with its own wheels.

3. A plough as claimed in claim 2 including lifting means enabling either frame to be lifted in relation to its wheels.

4. A plough as claimed in claim 2 in which one part of the boom has two wheels one of which can swivel on the vertical axis.

5. A plough as claimed in claim 4 in which all the wheels other than the said one have means enabling them to be held at a set angle to the boom.

6. A plough as claimed in claim 1 in which each boom part is built up from a number of boom sections fitted together, most of said sections each being provided its own plough share.

7. A plough as claimed in claim 1 in which the wheels are removably mounted on the booms.

8. A plough as claimed in claim 1 in which each wheel is rotatable about a vertical axis.

9. A plough as claimed in claim 1 including an adjustable length connection between a point on the leading boom part and a drawbar by which it is arranged to be towed.

* * * * *